United States Patent Office 3,812,137
Patented May 21, 1974

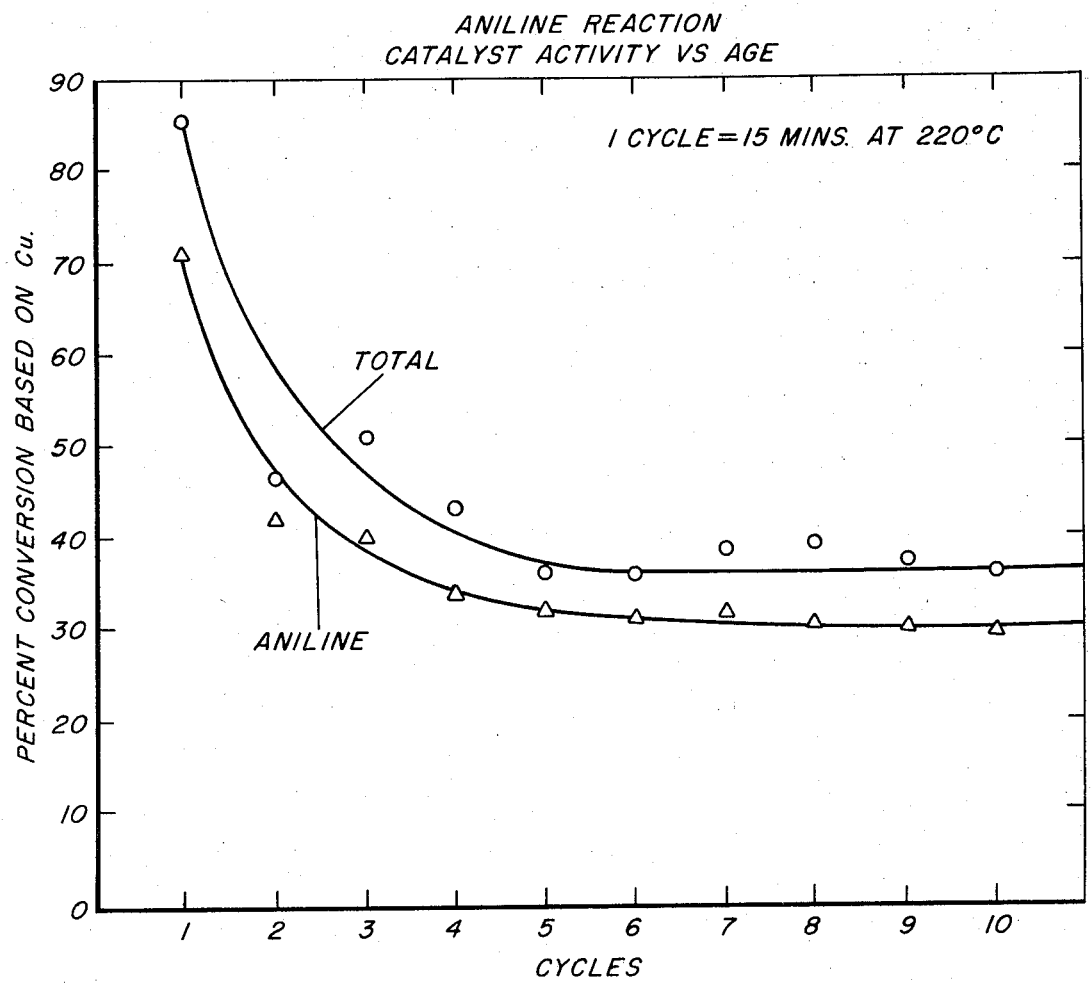

3,812,137
CATALYTIC PRODUCTION OF ANILINE AND OTHER AMINES FROM CARBOXYLIC ACIDS AND AMMONIA
Francis Clyde Rauch and Gregory Gerasimos Arzoumanidis, Stamford, Conn., assignors to American Cyanamid Company, Stamford, Conn.
Filed Nov. 29, 1971, Ser. No. 202,786
Int. Cl. C07d 31/42
U.S. Cl. 260—296 R    25 Claims

ABSTRACT OF THE DISCLOSURE

Aromatic and heterocyclic carboxylic acids are converted to amines by reaction with ammonia or a primary or secondary aromatic or aliphatic amine and a polyvalent metal compound using heat and pressure. Examples include conversion of benzoic acid to aniline, nicotinic acid to aminopyridine, etc. Preferred metal compounds include cupric oxide. Ammonia is the preferred amino reactant. The metal compound is reduced in the reaction but the reduced species is easily oxidized for use in subsequent reactions to provide an essentially catalytic process.

---

The invention relates to the conversion of aromatic carboxylic acids and heterocyclic carboxylic acids to amines in a process wherein a carboxyl group attached directly to a carbon member of the aromatic or heterocyclic ring structure is removed and amino is attached at the same or another carbon atom in the ring structure, predominantly at a position ortho to the original carboxyl group. For example, benzoic acid is converted to aniline and nicotinic acid is converted to aminopyridine by the process of the invention.

The reaction is carried out by heating the organic acid with water and ammonia or a selected amine under pressure and in presence of an oxide or other compound of a multivalent metal in its higher oxidation state. The higher valence state oxides or organic salts of copper, palladium, rhodium, mercury, lead, cobalt or iron are suitable metal reactants. The reaction is stoichiometric with respect to the metal compound, which is reduced by the reaction to a lower valence state. However, as will be shown below, the reaction can be used as a catalytic process by combining a step of oxidizing the reduced metal reaction product. The most preferred metal reactant is copper in a cupric compound; cupric oxide is quite suitable for the purpose.

In the prior art it is known to react aromatic acids with ammonia and hydrogen under heat and pressure in presence of copper oxide and other metal oxides to produce an amine product in which carboxyl is converted to aminomethyl. Such a process is described in U.S. Pat. No. 2,166,971. A typical process described in that patent produces benzylamine from benzoic acid. The present invention differs from the process described in the patent by the important fact that it does not employ hydrogen in the process hence can use somewhat lower pressure than those described in the patent. But the present invention differs essentially from the process described in the patent because each process produces a different product. Instead of producing benzylamine from benzoic acid as in the patent, the present process produces aniline from benzoic acid.

It is also known to produce phenols by oxidation of aromatic carboxylic acids using cupric compounds as catalysts. A process of this kind is described for example in U.S. Pat. No. 3,061,651. Also, it is known to react phenols with ammonia to produce amines such as aniline. Under the reaction conditions of the present invention some phenol may be produced as a by-product, however, the amine product is not produced by the reaction of phenol with ammonia under the reaction conditions of the present invention.

According to the invention, a selected aromatic or heterocyclic acid having carboxyl attached to a carbon atom in the ring structure, is reacted with ammonia or an amine, preferably a primary or secondary aliphatic or alkyl amine and a selected metal compound, preferably a cupric compound, in presence of water and under pressure in the range from about atmospheric pressure to about 2000 p.s.i.g. and at reaction temperature in the range from about 100° C. to about 350° C. and preferably from 150° C. to 250° C. It is preferred to exclude oxygen, hence to exclude air, from the reaction to avoid oxidation of the ammonia or selected amine reactant by oxygen under the reaction conditions. The product is amine in which amino can be considered as replacing carboxyl but the replacement may be either at the same or at another carbon atom in the ring structure. By-products may include the corresponding phenol, by replacement of carboxyl with hydroxyl, and in some cases also a diphenylamine or the like may be produced.

The drawings illustrate a graphic plot of conversions obtained in a series of reactions as will be explained in more detail.

Although the invention is particularly advantageous for production of aniline from benzoic acid, other aromatic amines and heterocyclic amines can be produced by the process of the invention from other aromatic and heterocyclic carboxylic acids having the carboxyl group attached directly to a ring carbon atom. Amines are produced from dicarboxylic acids of the defined class, e.g. from terephthalic acid by the same process, but the diacids in several cases will produce monoamino compounds in which both of the carboxyl groups of the diacid have been removed. Thus, terephthalic acid produces aniline in the process of the invention. Acids that can be used for the reaction may include functional groups other than carboxyl which in most cases will remain inert. Substituted groups or substituted atoms that may be present in addition to carboxyl in the reactive acids include halogen atoms, nitro groups, hydroxyl groups, sulfhydryl groups, sulfonic acid groups, alkyl or aromatic radicals, sulfones and the like. The ring structures in the acid molecules may be carbocyclic rings such as benzene and naphthalene rings or may comprise other condensed aromatic structures such as anthracene, anthraquinone, phenanthrene, pyridine and the like. They may be mixed carbocyclic and heterocyclic multiple ring structures such as quinoline, isoquinoline, carbazole, acridine and the like or simpler heterocyclic rings such as thiophene, pyridine, furan and the like. Generally the process of the invention will be useful for replacing carboxyl with amino at an adjacent carbon atom in the ring of any aromatic or heterocyclic carboxylic acid having carboxyl attached to a carbon atom of the ring structure.

Typical specific acids of the class useful in this invention include, but are not limited to, benzoic, toluic, chlorobenzoic and nitrobenzoic acids; phthalic, isophthalic and terephthalic acids; picolinic, nicotinic and isonicotinic acids; 2-furoic acid, 2-thiophene carboxylic acid; the various isomers of naphthoic and substituted naphthoic acids; quinoline and isoquinoline carboxylic acids, e.g. quinaldic acid or 6-quinoline carboxylic acid, mono carboxylic acids of anthracene, phenanthrene, anthraquinone and acridine and the like.

Esters of the selected acid or anhydrides of dibasic acids may be used as starting materials but usually will not be preferred. It is not necessary to use water in the reaction mixture to obtain the amine product, but water is preferred because it appears to inhibit undesired formation of carboxamide condensation products. It is preferred to operate the invention with about 5 moles of water per mole of the metal compound, e.g. per mole of cupric oxide. Excessive water leads to the undesired increase of the conversion to phenol by-product. In various embodiments the process can be operated with from about 2 to about 8 moles of water per mole of the metal compound in the reaction mixture. Amides are by-products of this process. They are generally inhibitors of the amine producing reaction. Water reacts with the amides under the described conditions to form acids which are the starting materials in the process. Ammonia is added in excess usually about 8 moles per mole of the metal compound. However, this ratio may vary from about 5 to 20. An optimum ratio between water and ammonia is about 3:5. The acid is also added in excess, e.g. 4 moles per mole of cupric oxide. The excess acid functions also as the reaction medium in some embodiments.

EXAMPLE 1

Three grams of cupric oxide, 20.0 grams of benzoic acid and 3.0 grams of $H_2O$ are charged to a 300 ml. high pressure reactor. Five grams of $NH_3$ is inserted at room temperature bringing the pressure in the reactor to 120 p.s.i.g. The mixture is heated to about 215–220° C. and reacts at that temperature for 30 minutes. The maximum recorded pressure in the reactor is 570 p.s.i.g. during the reaction. After quenching and opening the reactor, the products are separated by steam distillation and extraction. Vapor phase chromatography (VPC) and infrared (IR) analysis show that these products are:

| | Percent yield |
|---|---|
| Aniline | 82 |
| Diphenylamine | 6 |
| Phenol | 6 |

Yields are based on the cupric or other polyvalent metal oxide starting material which is the limiting reactant in these examples.

EXAMPLE 2

A mixture of 5.13 grams CuO, 4.0 grams isonicotinic acid and 3.0 grams $H_2O$ are inserted in a 270 ml. pressure reactor. To this is added 7.0 grams of $NH_3$ which raises the pressure to 120 p.s.i.g. initially. The mixture is heated and reacted at 215–217° C. for 30 minutes. The highest pressure during the reaction is 640 p.s.i.g. After quenching, the reactor is opened and the products are analyzed by VPC and IR. The total yield in aminopyridines (AMP) was 10%, based on the starting copper compound. Isomers are present in the following molar ratio:

2—AMP: 43%
3—AMP: 45%
4—AMP: 12%

EXAMPLE 3

Nicotinic acid is aminated as in Example 2. The yield is about the same but the product distribution is as follows:

2—AMP: 70%
3—AMP: 7%
4—AMP: 23%

EXAMPLE 4

Example 2 is repeated with picolinic acid as a starting material instead of isonicotinic acid. The yield is the same except for the isomer distribution:

2—AMP: 92%
3—AMP: 8%
4—AMP: None

EXAMPLE 5

Eleven grams of 1-naphthoic acid, 5 grams of CuO and 3 grams of water are charged into a pressure reactor of 300 ml. capacity. Five grams of $NH_3$ is admitted at room temperature to an initial pressure of 120 p.s.i.g. The mixture is heated and reacted at 205° C. for 30 minutes. Analysis of the products by VPC shows the formation of 2-naphthylamine at 36% yield. Only traces of 1-naphthylamine were formed.

EXAMPLE 6

Example 5 is repeated with 2-naphthoic acid instead of the 1-isomer. The results are the same.

EXAMPLE 7

Three grams of water, 8.8 grams of anthraquinone, 2-carboxylic acid and 1.8 grams of CuO are charged into a 300 ml. pressure reactor. Seven grams of $NH_3$ is admitted to a pressure of 140 p.s.i.g. at room temperature. The mixture is heated and allowed to react at 215–220° C. for 30 minutes. VPC and IR analysis of the reaction products shows the formation of 2-aminoanthraquinone in 15% yield. Only a trace of the 1-isomer was formed.

EXAMPLE 8

20.50 grams of phthalic acid, 7.70 grams of CuO, 5 grams of $H_2O$ and 15 grams of $NH_3$ are reacted as in the preceding example. Aniline is produced in 35% yield.

EXAMPLE 9

10.0 grams of m-chlorobenzoic acid, 5.0 grams of CuO, 3 grams of $H_2O$ and 8 grams of $NH_3$ are reacted in a 300 ml. reactor at 200° C. for 30 minutes. p-Chloroaniline is found among the reaction products in 25% yield.

EXAMPLE 10

Example 9 is repeated substituting m-nitrobenzoic acid for m-chlorobenzoic acid. p-Nitroaniline is produced in about 8% yield.

EXAMPLE 11

A mixture of 20.0 grams of m-toluic acid, 3.0 grams of CuO, 3.0 grams of $H_2O$, and 7.0 grams of $NH_3$ are charged to a 300 cc. autoclave. The mixture is heated to 215–220° C. for 30 minutes. After quenching, the autoclave is opened and the products are analyzed by VPC and IR. The yield of toluidine is about 60% of which 85% is the p-isomer and 15% is the o-isomer. Small amounts of corresponding cresols are also observed.

EXAMPLE 12

The procedure of Example 11 is followed substituting 20.05 grams of 3,4-dimethyl benzoic acid for the m-toluic acid. The yield of xylidines is about 50% of which 95% is the 3,4-isomer and 5% is the 2,3-isomer.

EXAMPLE 13

Example 1 is repeated using $Pd(C_6H_5COO)_2$ instead of CuO. Aniline is produced in 10% yield.

The reaction may be made catalytic with respect to the metal compound, e.g. CuO by re-oxidizing the reduced metal ion back to the higher valence state with oxygen. When ammonia is used, oxygen should preferably not be charged to the reaction vessel during the amination reaction because some oxidation of ammonia to various nitric oxides would occur under the reaction conditions. The stoichiometric reaction of CuO, carboxylic acid and ammonia is run to produce the aromatic amine, then the amine product and by-products are separated from the mixture typically by steam distillation. During or after this separation process, the reduced metal species in the reactor can be easily re-oxidized to its higher valence state by admitting air. The oxidation of the metal occurs very rapidly in the presence of ammonia, simply by exposure to air at atmospheric pressure and at room temperature. An amount of benzoic acid, the selected carbocyclic acid, e.g. equivalent to the amount of product removed, is added, and the reaction is repeated in a second cycle at the reaction conditions.

EXAMPLE 14

Ten such cycles are carried out as described above, repeating the process described in Example 1 for each cycle and reusing the distillation residue from the last previous cycle. The conversion based on Cu drops during the first 3 to 4 repreated cycles but then conversion levels out in the rest of the cycles. Effectively, the catalytic activity of the copper is decreased probably by some sort of complex formation with by-product benzamide. A graph showing the precent conversion to aniline and total conversion based on the copper reactant, plotted against the number of each of the succeeding cycles is shown on the graphic plot in the drawings. From cycle 4 on the yields based on benzoic acid are about 88% aniline, 2% diphenyl amine and 10% phenol. The graphic plot also shows that the selectivity to aniline does not change on recycling the Cu. The entire process is catalytic. Basically, there are two stoichiometric reactions carried out sequentially, the overall effect of which is a catalytic reaction.

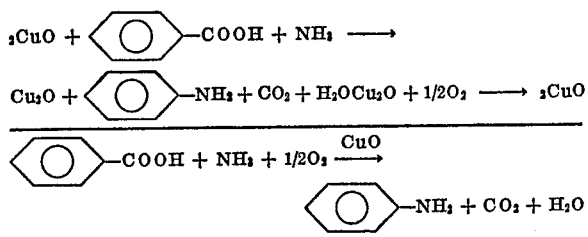

This re-oxidation feature makes the process more economical. The stoichiometry shown above has been simplified to some extent. Much, or all, of the cuprous ion product may actually occur in the form of cuprous benzoate or in amine complexes of cuprous benzoate. Also some of the $CO_2$ may actually appear as carbonate ion in the product mixture.

Instead of ammonia as a reactant, one may employ an amine, preferably an alkyl or aryl primary or secondary amine, but tertiary amines may also be used. The corresponding amine products will be secondary or tertiary amines.

We claim:

1. A process of making an aromatic or heterocyclic amine from an aromatic or heterocyclic carboxylic acid having a carboxyl group attached directly to a ring carbon atom in the aromatic or heterocyclic acid molecule, said method comprising reaction of the defined acid, ammonia, and a compound of a polyvalent metal selected from copper and palladium in a higher valence state, in presence of water at reaction temperature in the range from 100° C. to 350° C. under pressure in the range from atmospheric pressure to about 2000 p.s.i.g. for sufficient time to decarboxylate the acid reactant and substitute amino for the carboxyl group at the same or another ring carbon atom of the molecule.

2. A process defined by claim 1 wherein the defined acid reactant is benzoic acid and the amine product is aniline.

3. A process defined by claim 1 wherein the defined acid is nicotinic or isonicotinic or picolinic acid and the amine product is aminopyridine.

4. A process defined by claim 1 wherein the defined acid is naphthoic acid and the amine product is naphthylamine.

5. A process defined by claim 1 wherein the defined acid is anthraquinone carboxylic acid and the amine product is aminoanthraquinone.

6. A process defined by claim 1 wherein the defined acid is phthalic acid and the amine product is aniline.

7. A process defined by claim 1 wherein the defined acid is nitrobenzoic acid and the amine product is nitroaniline.

8. A process defined by claim 1 wherein the defined metal compound is a cupric compound.

9. A process defined by claim 1 wherein the defined metal compound is a palladium compound.

10. A process defined by claim 1 wherein the defined metal compound is cupric oxide.

11. A method defined by claim 2 wherein the defined metal compound is cupric oxide.

12. A method defined by claim 3 wherein the defined metal compound is cupric oxide.

13. A process defined by claim 4 wherein the defined metal compound is cupric oxide.

14. A process defined by claim 6 wherein the defined metal compound is cupric oxide.

15. A process defined by claim 7 wherein the defined metal compound is cupric oxide.

16. A process defined by claim 8 wherein the defined metal compound is cupric oxide.

17. A process defined by claim 1 wherein the defined metal compound is palladium dibenzoate.

18. A process defined by claim 1 comprising a series of reactions of the kind defined, wherein the reduced metal compound produced by one reaction in said series is oxidized after said one reaction and the oxidized product thereof is used as a reactant in the next reaction in said series.

19. A process defined by claim 18 wherein the defined metal compound reactant is cupric oxide, the defined acid is benzoic acid and the defined amine product is aniline.

20. A process defined by claim 1 wherein the defined acid is chlorobenzoic acid and the amine product is chloroaniline.

21. A process defined by claim 20 wherein the defined metal compound is cupric oxide.

22. A process defined by claim 1 wherein the defined acid is toluic acid and the amine product is toluidine.

23. A process defined by claim 22 wherein the defined metal compound is cupric oxide.

24. A process defined by claim 1 wherein the defined acid is 3,4-dimethylbenzoic acid and the amine product is xylidine.

25. A process defined by claim 24 wherein the defined metal compound is cupric oxide.

References Cited

UNITED STATES PATENTS 2,166,971   7/1939   Schmidt et al. _____ 260—583

OTHER REFERENCES

Erofeev et al., Chem. Abstracts 72: 120806a (1970).

JOHN D. RANDOLPH, Primary Examiner

G. T. TODD, Assistant Examiner

U.S. Cl. X.R.

260—378, 382, 578, 581